(12) United States Patent
Hawkins et al.

(10) Patent No.: US 11,300,107 B2
(45) Date of Patent: Apr. 12, 2022

(54) DETECTION OF OSCILLATING MOVEMENT OF A WIND TURBINE

(71) Applicant: Siemens Gamesa Renewable Energy A/S, Brande (DK)

(72) Inventors: Samuel H. Hawkins, Vejle (DK); Gustav Hoegh, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/955,409

(22) PCT Filed: Dec. 12, 2018

(86) PCT No.: PCT/EP2018/084521
§ 371 (c)(1),
(2) Date: Jun. 18, 2020

(87) PCT Pub. No.: WO2019/134798
PCT Pub. Date: Jul. 11, 2019

(65) Prior Publication Data
US 2021/0095640 A1    Apr. 1, 2021

(30) Foreign Application Priority Data

Jan. 2, 2018  (EP) ..................................... 18150056

(51) Int. Cl.
*F03D 9/00* (2016.01)
*H02P 9/04* (2006.01)
(Continued)

(52) U.S. Cl.
CPC ........... *F03D 17/00* (2016.05); *F03D 7/0276* (2013.01); *F03D 7/0296* (2013.01);
(Continued)

(58) Field of Classification Search
CPC ........ F03D 7/048; F03D 7/0284; F03D 17/00; F03D 7/0276; F03D 7/0296; H02J 3/381;
(Continued)

(56) References Cited

U.S. PATENT DOCUMENTS 6,876,099 B2    4/2005  Wobben
7,772,713 B2 *  8/2010  Huang .................... F03D 7/043
                                                              290/44

(Continued)

FOREIGN PATENT DOCUMENTS

CN        101629554 A    1/2010
CN        102384031 A    3/2012
(Continued)

OTHER PUBLICATIONS

International Search Report and Written Opinion dated Mar. 20, 2019 for PCT/EP2018/084521.
(Continued)

*Primary Examiner* — Tulsidas C Patel
*Assistant Examiner* — Thomas K Quigley
(74) *Attorney, Agent, or Firm* — Schmeiser, Olsen & Watts LLP

(57) ABSTRACT

Provided is a system for determining an amount of oscillating movement of a wind turbine, the wind turbine including a tower, a non-rotating upper part supported by the tower, a rotor having a rotor axis, and a generator for generating electric power. The system includes (a) a sensor unit adapted to provide a rotor speed signal indicative of a rotational speed of the rotor relative to the non-rotating upper part, (b) a filtering unit adapted to, based on the rotor speed signal provided by the sensor unit, provide a filtered signal including information associated with an oscillating movement of the wind turbine, and (c) a processing unit adapted to determine the amount of oscillating movement
(Continued)

based on the filtered signal provided by the filtering unit. Furthermore, a wind turbine and a method are described.

14 Claims, 2 Drawing Sheets

(51) Int. Cl.
   *F03D 17/00* (2016.01)
   *F03D 7/02* (2006.01)
(52) U.S. Cl.
   CPC . *F05B 2270/1016* (2013.01); *F05B 2270/304* (2013.01); *F05B 2270/327* (2013.01); *F05B 2270/334* (2013.01); *F05B 2270/807* (2013.01)
(58) Field of Classification Search
   CPC ........ F05B 2270/1016; F05B 2270/304; F05B 2270/327; F05B 2270/334; F05B 2270/807
   See application file for complete search history.

(56) References Cited

U.S. PATENT DOCUMENTS

| | | | |
|---|---|---|---|
| 8,057,158 B2 | 11/2011 | Seidel et al. | |
| 8,482,143 B2* | 7/2013 | Drossel | F03D 7/0276 |
| | | | 290/44 |
| 8,823,199 B2* | 9/2014 | Tull de Salis | F03D 3/064 |
| | | | 290/55 |
| 2007/0182162 A1* | 8/2007 | McClintic | F03D 1/0608 |
| | | | 290/55 |
| 2010/0013235 A1 | 1/2010 | Bjerge | |
| 2011/0140425 A1 | 6/2011 | Staedler | |
| 2012/0056427 A1* | 3/2012 | Drossel | F03D 7/0276 |
| | | | 290/44 |
| 2013/0134717 A1* | 5/2013 | Tull de Salis | F03D 3/064 |
| | | | 290/55 |
| 2013/0277971 A1* | 10/2013 | Cho | H02P 9/04 |
| | | | 290/44 |

FOREIGN PATENT DOCUMENTS

| | | | |
|---|---|---|---|
| CN | 102400850 A | 4/2012 | |
| WO | WO-2015085465 A1 * | 6/2015 | ............... F03D 9/25 |
| WO | 2016091945 A1 | 6/2016 | |
| WO | 2017036481 A1 | 3/2017 | |

OTHER PUBLICATIONS

European Search Report and Written Opinion of the European Searching Authority dated Jul. 3, 2018 for Application No. 18150056.2.

* cited by examiner

DETECTION OF OSCILLATING MOVEMENT OF A WIND TURBINE

CROSS-REFERENCE TO RELATED APPLICATIONS

This application claims priority to PCT Application No. PCT/EP2018/084521, having a filing date of Dec. 12, 2018, which is based on EP Application No. 18150056.2, having a filing date of Jan. 2, 2018, the entire contents both of which are hereby incorporated by reference.

FIELD OF TECHNOLOGY

The following relates to the field of wind turbines, in particular to detection of oscillating wind turbine movement. More specifically, the following relates to a system for determining an amount of oscillating movement of a wind turbine, a wind turbine comprising such a system, and a method of determining an amount of oscillating movement of a wind turbine.

BACKGROUND

Modern wind turbines are built upon towers of ever increasing heights. These large structures can be excited by the normal operation of the turbine influenced by the operational environment. Thereby, substantial oscillating movements may occur, in particular in the tower structure. Large motion of the tower may cause structural damage.

An accelerometer may be used in the tower top to detect severe oscillations, such that the wind turbine control system can stop the wind turbine in a safe manner. However, with this approach only movement of the tower top is captured. Thus, more complex patterns of movement where the tower top does not move as significantly as other parts of the structure cannot be detected.

Accordingly, there is a need for a system that can detect such complex patterns of oscillating movement in order to effectively protect the wind turbines against structural damage.

SUMMARY

According to a first aspect of embodiments of the invention, there is provided system for determining an amount of oscillating movement of a wind turbine, the wind turbine comprising a tower, a non-rotating upper part supported by the tower, a rotor having a rotor axis, and a generator for generating electric power. The system comprises (a) a sensor unit adapted to provide a rotor speed signal indicative of a rotational speed of the rotor relative to the non-rotating upper part, (b) a filtering unit adapted to, based on the rotor speed signal provided by the sensor unit, provide a filtered signal comprising information associated with an oscillating movement of the wind turbine, and (c) a processing unit adapted to determine the amount of oscillating movement based on the filtered signal provided by the filtering unit.

This aspect of embodiments of the invention is based on the idea that the rotational speed of the rotor relative to the non-rotating upper part as measured by the sensor unit will be influenced by movement of the wind turbine and that this influence (or at least a selected part thereof) can be determined by filtering the rotor speed signal from the sensor unit. More specifically, since the rotation of the rotor relative to earth (i.e. the true rotational speed of the rotor) will not be influenced by tower movement, any movement in the wind turbine structure, which causes a rolling movement of the non-rotating upper part of the wind turbine, will cause corresponding variations in the rotor speed measured by the sensor unit. In other words, oscillating movements in the tower structure will cause corresponding oscillations in the rotor speed signal from the sensor unit. By filtering out these oscillations from the rotor speed signal, the amount of oscillating movement (i.e. the amplitude of the oscillating movement at a particular location, such as a selected position along the tower) can be determined.

According to an embodiment of the invention, the sensor unit comprises a sensor, in particular an optical and/or magnetic sensor, adapted to detect a predetermined pattern on the rotor.

The sensor is mounted on the non-rotating upper part of the wind turbine in position suitable for detecting the predetermined pattern on the rotor.

According to a further embodiment of the invention, the sensor unit comprises a frequency sensor adapted to detect a frequency of electric power generated by the generator.

The frequency of the electric power generated by the generator depends on the rotational speed of the rotor (relative to the non-rotating part of the wind turbine). Thus, by measuring this frequency, a measure of the rotational speed relative to the non-rotating part is obtained in a simple manner.

According to a further embodiment of the invention, the wind turbine further comprises a gearbox and a high speed coupling arranged between the generator and the rotor, and the sensor unit comprises a sensor adapted to detect a rotational speed of the high speed coupling relative to the non-rotating upper part.

The rotational speed of the high speed coupling will be related to the rotational speed of the rotor and will therefore contain the same information associated with oscillating movement of the wind turbine as the rotor speed since it is measured relative to the non-rotating upper part of the wind turbine.

According to a further embodiment of the invention, the system further comprises (a) a further sensor unit adapted to provide a further rotor speed signal indicative of the rotational speed of the rotor relative to ground, and (b) a subtraction unit adapted to subtract the further rotor speed signal from the rotor speed signal to thereby provide a roll signal indicative of an angular roll speed of the non-rotating upper part. The filtering unit is adapted to provide the filtered signal comprising information associated with the oscillating movement of the wind turbine based on the roll signal.

In this embodiment, a further rotor speed signal is provided by a further sensor unit. The further rotor speed signal represents the true rotational speed of the rotor, i.e. the rotational speed relative to ground or earth. By subtracting the further rotor speed signal from the rotor speed signal, a roll signal is obtained which comprises information on the angular roll speed of the non-rotating upper part of the wind turbine, i.e. the part of the rotor speed signal which is caused by wind turbine movement(s) causing side-to-side movement of the non-rotating part. By filtering this roll signal, which is derived from the rotor speed signal and the further rotor speed signal, the magnitude of a particular oscillating movement in the wind turbine structure can be obtained.

According to a further embodiment of the invention, the further sensor unit comprises an inertial sensor adapted to be arranged at the rotor.

The inertial sensor may comprise an accelerometer and/or a gyroscopic sensor arranged in a hub of the rotor.

According to a further embodiment of the invention, the filtering unit comprises a bandpass filter centered on a fundamental frequency of the tower.

By utilizing a bandpass filter centered on a fundamental frequency of the tower, information relating to an oscillating movement (in particular the magnitude thereof) corresponding to the fundamental frequency can be obtained.

The fundamental frequency may in particular denote an eigenfrequency of the tower or.

According to a further embodiment of the invention, the fundamental frequency of the tower corresponds to a second or higher order fundamental mode of the tower.

By filtering out the higher order modes (i.e. the second fundamental mode, the third fundamental mode, etc.) the amount of movement corresponding to these particular modes of oscillating movement can be obtained. Accordingly, excessive magnitudes of movement contained in complex patterns of movement can be detected even in cases where the upper part of the wind turbine itself does not move very much, for example when a mid section (or one or more other sections) of the tower between ground and the upper part is swinging from side to side.

According to a further embodiment of the invention, the processing unit is adapted to utilize a mathematical model of the tower to determine the amount of oscillating movement.

The mathematical model describes the physical properties of the tower and includes relevant physical parameters (e.g. tower height, tower stiffness, and tower-top mass) of the wind turbine.

According to a further embodiment of the invention, the mathematical model of the tower provides a relation between tower acceleration and the angular roll speed of the non-rotating upper part.

According to a further embodiment of the invention, the system further comprises a warning unit adapted to compare the determined amount of oscillating movement with a threshold value and output a warning signal if the determined amount of oscillating movement exceeds the threshold value.

The warning signal may simply indicate that dangerous oscillating movement occurs. Alternatively, the warning signal may also indicate the amount of movement such that a wind turbine control system can choose an appropriate action, such as a load reduction, rotor speed reduction, or emergency shut-down.

According to a second aspect of embodiments of the invention, there is provided a wind turbine. The wind turbine comprises (a) a tower, (b) a non-rotating upper part supported by the tower, (c) a rotor having a rotor axis, (d) a generator for generating electrical power, and (e) a system according to the first aspect or any of the above embodiments.

This aspect of embodiments of the invention relates to a wind turbine fitted with an advantageous system according to the first aspect (or one of the above described embodiments). Accordingly, the wind turbine is capable of detecting the amount of oscillation movement to thereby protect itself in cases of dangerously large oscillating movements.

According to a third aspect of embodiments of the invention, there is provided a method of determining an amount of oscillating movement of a wind turbine, the wind turbine comprising a tower, a non-rotating upper part supported by the tower, a rotor having a rotor axis, and a generator for generating electrical power. The method comprises (a) providing a rotor speed signal indicative of a rotational speed of the rotor relative to the non-rotating upper part, (b) providing a filtered signal based on the rotor speed signal, the filtered signal comprising information associated with an oscillating movement of the wind turbine, and (c) determining the amount of oscillating movement based on the filtered signal.

This aspect of embodiments of the invention is based on essentially the same idea as the first aspect described above.

It is noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular to combinations of features of the method type claims and features of the apparatus type claims, is part of the disclosure of this document.

The aspects defined above and further aspects of embodiments of the present invention are apparent from the examples of embodiments to be described hereinafter and are explained with reference to the examples of embodiments. Embodiments of the invention will be described in more detail hereinafter with reference to examples of embodiments. However, it is explicitly noted that embodiments of the invention is not limited to the described exemplary embodiments.

BRIEF DESCRIPTION

Some of the embodiments will be described in detail, with reference to the following figures, wherein like designations denote like members, wherein.

DETAILED DESCRIPTION

Figure 1:
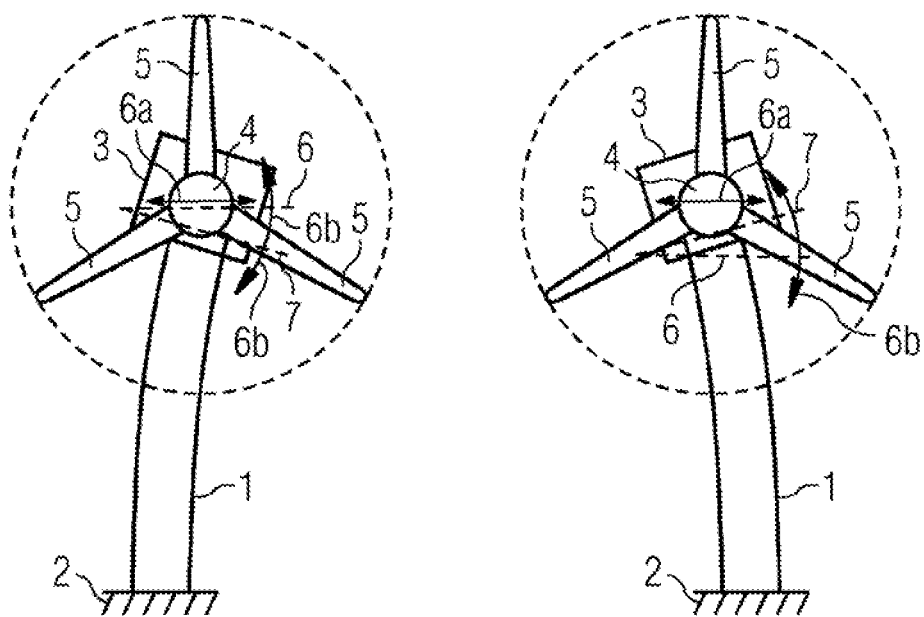
FIG. 1 shows a schematic illustration of roll motion of an upper part of a wind turbine caused by simple tower sway.

FIG. 1 shows a schematic illustration of roll motion of an upper part of a wind turbine caused by simple tower sway or side-to-side movement, i.e. $1^{st}$ mode tower sway. More specifically, FIG. 1 shows a wind turbine comprising a tower 1 mounted to the ground 2, an upper non-rotating part 3 housing a rotor 4 with rotor blades 5. The left-hand part of FIG. 1 shows a state where the tower 1 has swayed to the right and the right-hand part of FIG. 1 shows a state where the tower 1 has swayed to the left. The dashed line 6 is horizontal and the dashed line 7 shows the plane of the bottom of the non-rotating upper part 3 (also referred to as a nacelle) of the wind turbine. As indicated by arrow 6a, the swaying movement of tower 1 causes sideways movement of the upper part 3. Furthermore, as indicated by arrow 6b, the swaying movement of tower 1 also causes a corresponding angular roll movement of the upper part 3. In other words, in this case the maximum lateral movement is in the tower top and may thus be detected by an accelerometer.

Figure 2:
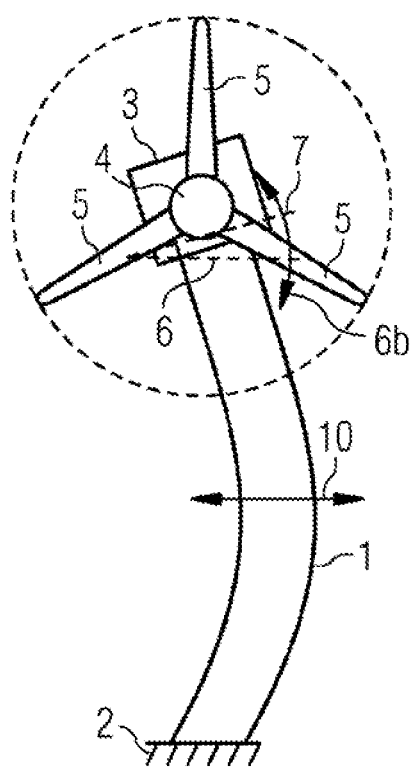
FIG. 2 shows a schematic illustration of roll motion of an upper part of a wind turbine caused by $2^{nd}$ mode tower sway.

FIG. 2 shows a schematic illustration of roll motion of an upper part of the wind turbine caused by $2^{nd}$ mode tower sway. More specifically, FIG. 2 shows that an oscillating movement of a midsection of the tower 1 is taking place as indicated by arrow 10. As can be seen, the midsection moving from side to side in this manner also causes roll motion of the upper part 3 of the wind turbine as indicated by arrow 6b, whereas in this case no significant sideways movement of the upper part 3 takes place. In other words, there is no or insignificant lateral movement of the tower top. This means that an accelerometer in the tower top is not able to detect the oscillating movement indicated by arrow 10. Tower motion due the second fundamental tower mode can build up in large oscillations which may have a severe load impact on the tower structure.

Figure 3:
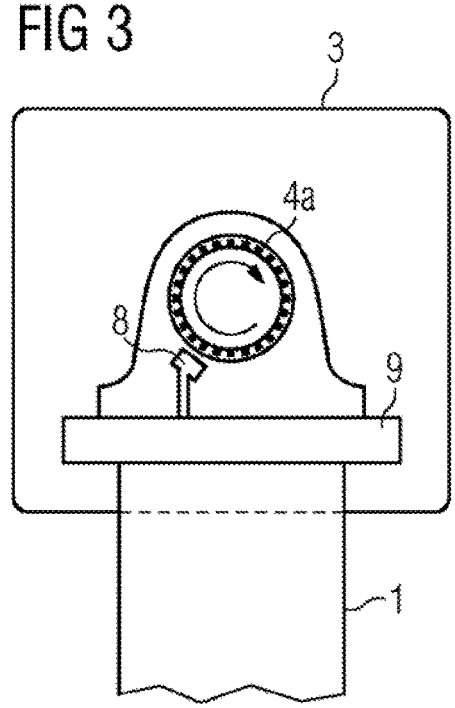
FIG. 3 shows a schematic illustration of an upper part of a wind turbine equipped with a rotor speed sensor.

FIG. 3 shows a schematic illustration of the upper part 3 of the wind turbine shown in FIG. 1 and FIG. 2 equipped with a rotor speed sensor 8. The rotor speed sensor 8 is mounted on surface 9, which is fixed to the top of the tower 1. The rotor speed sensor 8 may e.g. be an optical sensor or a magnetic sensor, capable of detecting a predetermined pattern on the surface of the rotor axis 4a. Referring again to FIGS. 1 and 2, it can be seen that the rolling motion of upper part 3 caused by the tower sway will influence the rotor speed detected by rotor speed sensor 8 (i.e. the rotor speed relative to the non-rotating upper part 3) but not the true rotor speed (relative to ground 2).

Since the fixed surface 9 where the rotor speed sensor 8 is mounted is also fixed to the tower top 3, then as the tower top 3 inclines side-to-side this sensor 8 has a rotational velocity aligned with the roll motion of the tower top. This roll motion, therefore, impacts the measurement of the rotor speed by causing a cyclic oscillation in the relative angular velocity between the fixed sensor 8 and the rotating shaft 4a. This introduces an error in the rotor speed measurement relative to what would be observed from a truly fixed frame of reference (such as the ground, for example).

Figure 4:
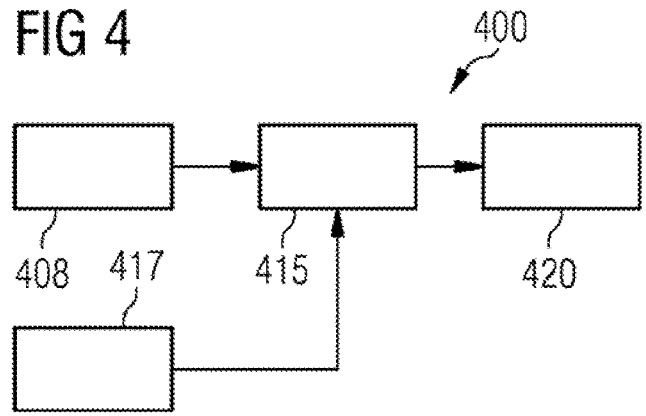
FIG. 4 shows a system according to an exemplary embodiment of the present invention.

FIG. 4 shows a system 400 according to an exemplary embodiment of the present invention. More specifically, the system 400 comprises a sensor unit 408, a filtering unit 415, fundamental frequency data 417, and a processing unit 420.

The sensor unit 408 may e.g. correspond to the rotor speed sensor 8 shown in FIG. 3, which is adapted to detect a rotational speed of the rotor 4 relative to the non-rotating upper part 3. Alternatively, the sensor unit 408 may be adapted to detect a frequency of electric power generated by the wind turbine generator (not shown) and thereby the rotational speed of the rotor 4 relative to the non-rotating upper part 3. As a further alternative, the sensor unit 408 may detect a rotational speed of another part of the drivetrain, in particular the rotational speed of a high speed coupling between a gearbox and the generator. The detected rotor speed signal is provided to the filtering unit 415.

The filtering unit 415 is adapted to obtain or generate a filtered signal based on the rotor speed signal, in particular by utilizing the fundamental frequency data 417. In particular, the filtering unit 415 may comprise or be a bandpass filter adapted to filter the rotor speed signal around a fundamental frequency included in fundamental frequency data 417, such as a around a fundamental frequency corresponding to a first mode, a second mode or a higher mode of oscillating tower movement.

The processing unit 420 receives the filtered signal and is adapted to determine the amount of oscillating movement based thereon, e.g. by applying a mathematical model of the wind turbine tower 1 with the non-rotating upper part 3 and rotor 4 in order to determine the magnitude of the oscillating movement.

Figure 5:
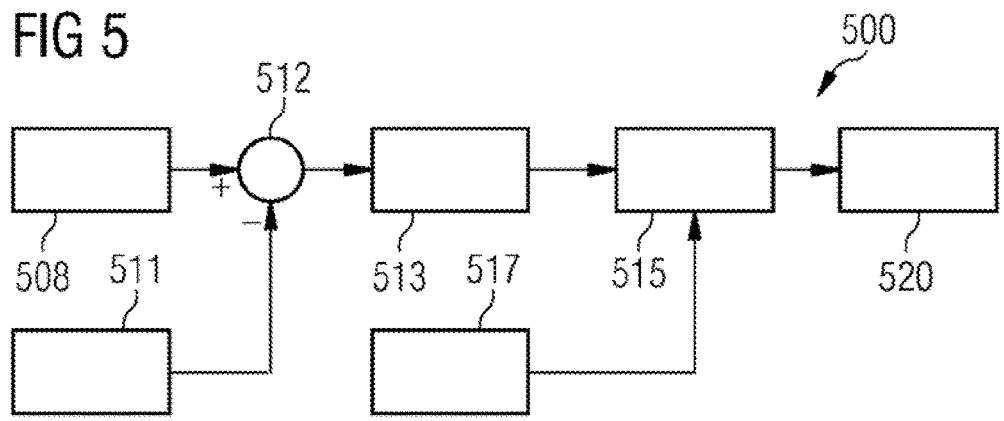
FIG. 5 shows a system according to a further exemplary embodiment of the present invention.

The system 400 may furthermore comprise a warning unit (not shown) adapted to compare the determined amount of oscillating movement with a threshold value and to output a warning signal if the determined amount of oscillating movement exceeds the threshold value. The warning signal may be used by a wind turbine controller to determine an appropriate action for protecting the wind turbine, e.g. by reducing load or by shutting down. The warning unit may be implemented as part of the processing unit 420 may FIG. 5 shows a system 500 according to a further exemplary embodiment of the present invention. More specifically, the system 500 comprises a sensor unit 508, a further sensor unit 511, a subtraction unit 512, a roll signal 513, a filtering unit 515, fundamental frequency data 517, and a processing unit 520.

The sensor unit 508, filtering unit 515, and fundamental frequency reference data 517 are similar to the corresponding units shown in FIG. 4 and will therefore not be described in further detail again.

The further sensor unit 511 comprises an inertial sensor, such as an accelerometer or a gyroscopic sensor, arranged in the hub of the rotor 4 and adapted to provide a further rotor speed signal indicative of the rotational speed of the rotor 4 relative to ground 2, i.e. the true rotational speed of rotor 4.

The subtractor 512 receives the rotor speed signal from sensor unit 508 and the further rotor speed signal from the further sensor unit 511, and calculates the corresponding difference by subtracting the latter from the first and thereby producing a roll signal 513 which is indicative of the angular roll speed of the non-rotating upper part 3.

The roll signal 513 is filtered by filtering unit 515 in a similar way as described above in conjunction with FIG. 4, i.e. by applying a bandpass filter centered on a fundamental tower frequency included in the fundamental frequency data 517 in order to extract the part of the signal that corresponds to a particular mode of movement, i.e. the first, second or any higher order mode.

The processing unit 520 processes the filtered signal and applies a suitable mathematical model of the tower to determine the magnitude of the oscillating movement.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A system for determining an amount of oscillating movement of a tower of a wind turbine, the wind turbine further comprising a non-rotating upper part supported by the tower, a rotor having a rotor axis, and a generator for generating electric power, the system comprising:

a sensor unit configured to provide a rotor speed signal indicative of a rotational speed of the rotor relative to the non-rotating upper part;

a filtering unit configured to, based on the rotor speed signal provided by the sensor unit, provide a filtered signal comprising information associated with an oscillating movement of the tower of the wind turbine; and a processing unit configured to determine the amount of oscillating movement based on the filtered signal provided by the filtering unit.

2. The system according to claim 1, wherein the sensor unit comprises a sensor configured to detect a predetermined pattern on the rotor.

3. The system according to claim 1, wherein the sensor unit comprises a frequency sensor configured to detect a frequency of electric power generated by the generator.

4. The system according to claim 1, wherein the wind turbine further comprises a gearbox and a high speed coupling arranged between the generator and the rotor, and wherein the sensor unit comprises a sensor configured to detect a rotational speed of the high speed coupling relative to the non-rotating upper part.

5. The system according to claim 1, further comprising:
a further sensor unit configured to provide a further rotor speed signal indicative of the rotational speed of the rotor relative to ground, and
a subtraction unit configured to subtract the further rotor speed signal from the rotor speed signal to thereby provide a roll signal indicative of an angular roll speed of the non-rotating upper part,
wherein the filtering unit is configured to provide the filtered signal comprising information associated with the oscillating movement of the wind turbine based on the roll signal.

6. The system according to claim 5, wherein the further sensor unit comprises an inertial sensor configured to be arranged at the rotor.

7. The system according to claim 1, wherein the filtering unit comprises a bandpass filter centered on a fundamental frequency of the tower.

8. The system according to claim 7, wherein the fundamental frequency of the tower corresponds to a second or higher order fundamental mode of the tower.

9. The system according to claim 1, wherein the processing unit is configured to utilize a mathematical model of the tower to determine the amount of oscillating movement.

10. The system according to claim 9, wherein the mathematical model of the tower provides a relation between tower acceleration and [[the]] an angular roll speed of the non-rotating upper part.

11. The system according to claim 1, further comprising a warning unit configured to compare the determined amount of oscillating movement with a threshold value and output a warning signal if the determined amount of oscillating movement exceeds the threshold value.

12. A method of determining an amount of oscillating movement of a tower of a wind turbine, the wind turbine further comprising a non-rotating upper part supported by the tower, a rotor having a rotor axis, and a generator for generating electric power, the method comprising:
providing a rotor speed signal indicative of a rotational speed of the rotor relative to the non-rotating upper part;
providing a filtered signal based on the rotor speed signal, the filtered signal comprising information associated with an oscillating movement of the tower of the wind turbine; and
determining the amount of oscillating movement based on the filtered signal.

13. A wind turbine comprising:
a tower;
a non-rotating upper part supported by the tower;
a rotor having a rotor axis;
a generator for generating electrical power; and
a system for determining an amount of oscillating movement of the tower, wherein the system includes a sensor unit configured to provide a rotor speed signal indicative of a rotational speed of the rotor relative to the non-rotating upper part, a further sensor unit configured to provide a further rotor speed signal indicative of the rotational speed of the rotor relative to ground, a subtraction unit configured to subtract the further rotor speed signal from the rotor speed signal to thereby provide a roll signal indicative of an angular roll speed of the non-rotating upper part, a filtering unit configured to, based on the roll signal, provide a filtered signal comprising information associated with an oscillating movement of the tower, and a processing unit configured to determine the amount of oscillating movement based on the filtered signal provided by the filtering unit.

14. The wind turbine according to claim 13, wherein the further sensor unit comprises an inertial sensor configured to be arranged at the rotor.

* * * * *